Figure 1:
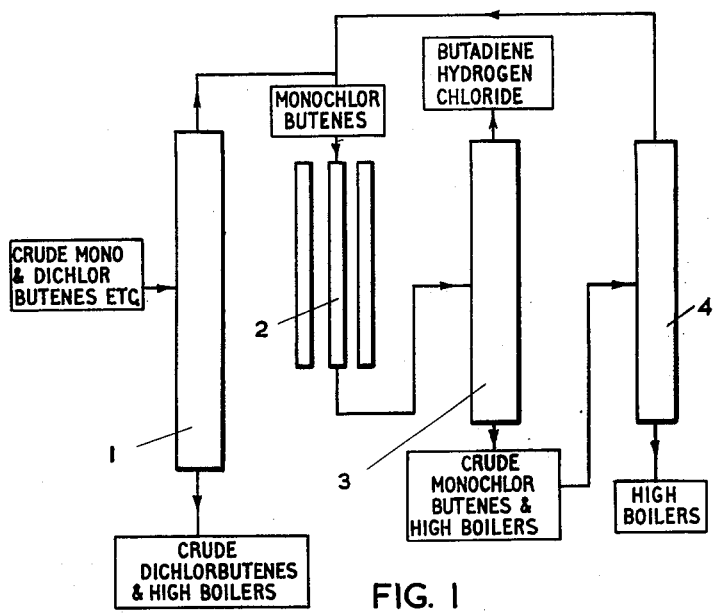

April 11, 1961  F. J. BELLRINGER ET AL  2,979,542
PRODUCTION OF DICHLORBUTENES

Filed July 9, 1959  2 Sheets-Sheet 1

INVENTORS.
FREDERICK JAMES BELLRINGER.
CLIFFORD WILLIAM CAPP.
FRANK CHRISTOPHER NEWMAN.
KARL HEINRICH WALTER TURCK.

BY
ATTORNEYS.

INVENTORS.
FREDERICK JAMES BELLRINGER.
CLIFFORD WILLIAM CAPP.
FRANK CHRISTOPHER NEWMAN.
KARL HEINRIC WALTER TURCK.

United States Patent Office 2,979,542
Patented Apr. 11, 1961

---

2,979,542

PRODUCTION OF DICHLORBUTENES

Frederick James Bellringer, Leatherhead, Clifford William Capp, Ewell, Frank Christopher Newman, Great Bookham, and Karl Heinrich Walter Turck, Banstead, England, assignors to The Distillers Company Limited, Edinburgh, Scotland Filed July 9, 1959, Ser. No. 826,075

Claims priority, application Great Britain July 25, 1958

5 Claims. (Cl. 260—654)

The present invention relates to the pyrolysis of monochlorbutenes and dichlorbutanes to produce butadiene and hydrogen chloride.

In our application Serial No. 657,661, now Patent No. 2,948,760 is described a process for the production of dichlorbutenes by the additive chlorination of butadiene-1:3 in the vapour phase at an elevated temperature, which comprises subjecting to chlorination a mixture comprising n-butene and butadiene-1:3, separating monochlorbutenes and/or dichlorbutanes from the chlorination product, subject the monochlorbutenes and/or dichlorbutanes to pyrolysis to produce butadiene, introducing this butadiene to the chlorination stage, and recovering dichlorbutenes from the chlorination product. Butane can also be a starting material in this chlorination process, the resulting monochlorbutanes being pyrolysed, together with the monochlorbutenes and dichlorbutanes produced from the butene, to produce butene. In this process the pyrolysis of the monochlorbutenes and/or dichlorbutanes results in the conversion of only a part, for example about 70%, of these compounds to butadiene and hydrogen chloride. The unpyrolyzed monochlorbutenes and/or dichlorbutanes in accordance with said application are separated from the butadiene and are then recycled to pyrolysis.

We have found in accordance with our invention that the mixture so recycled is a crude mixture containing high boilers, and that when this mixture is directly recycled to the pyrolysis step the efficiency of the process becomes greatly reduced. The reactor itself becomes clogged and diminishes the yield of the desired product. It is an object of the present invention to provide an improved process in which these difficulties are at least in part overcome, and particularly the clogging of the reactor is greatly reduced.

Accordingly, the present invention comprises the process of pyrolysing a monochlorbutene and/or a dichlorbutane to produce butadiene, removing butadiene and separating by fractional distillation of the pyrolysis product a fraction containing unpyrolysed monochlorbutene and/or dichlorbutane free from higher boiling compounds, and recycling the unpyrolysed monochlorbutene and/or dichlorbutane to the pyrolysis step.

The process of the present invention can be applied to monochlorbutenes and/or to dichlorbutanes made by any process. It is, however, preferred to use as starting material for the process monochlorbutenes and/or dichlorbutanes produced according to the process described in Patent No. 2,948,760. The pyrolysis reaction can be carried out in any suitable manner but is preferably carried out as described in the above mentioned application, for instance at temperatures between 450° and 750° C., and preferably between 500° and 600° C., and in a non-catalytic manner.

The separation by fractional distillation of the unpyrolysed components of the pyrolysis product from higher boiling compounds may be carried out in any suitable manner. If desired the whole pyrolysis product can be distilled to separate hydrogen chloride, butadiene, and monochlorbutenes and/or dichlorbutanes as a combined overhead fraction leaving the higher boiling compounds as residue. Alternatively, the hydrogen chloride and butadiene can first be separated from the pyrolysis product. In one embodiment, where the feed comprises monochlorbutenes the pyrolysis product is cooled and fed to a still in which butadiene and hydrogen chloride are removed as an overhead fraction while unpyrolysed monochlorbutenes and higher boiling compounds are withdrawn as a lower fraction. The base product is distilled to separate the monochlorbutenes as an overhead fraction leaving higher boiling impurities as the residue. In the case where the present process forms part of the overall process for the conversion of butane and/or butene to dichlorbutenes as described in Patent No. 2,948,760, this distillation may be carried out in the same still in which the chlorination reaction product, after removal of lower boiling compounds such as butane, butene and butadiene, is treated to separate monochlorbutenes from the higher-boiling dischlorbutenes. Alternatively, the either case the object is to separate the monochlorbutenes from the higher boiling residue of the pyrolysis product before recycling the monochlorbutenes to the pyrolysis.

In a preferred embodiment in which the process forms part of the overall process described in Patent No. 2,948,760, the whole pyrolysis product, including butadiene and hydrogen chloride is combined with the chlorination reaction product. The combined pyrolysis and chlorination reaction products are then fractionally distilled to separate as an overhead fraction lower boiling compounds such as butene and butadiene which are recycled to the chlorination reaction. The base product from this still is fractionally distilled in a subsequent still in which monochlorbutenes are separated as an overhead fraction, and passed to the pyrolysis stage, the high boiling products formed in the pyrolysis remaining in the base of the still with the crude dichlorbutenes.

The invention may be applied also to the case where dichlorbutanes are pyrolysed to butadiene and hydrogen chloride.

The accompanying drawings in the form of flow diagrams illustrate particular embodiments of the present invention as stages in the process for the conversion of butane and/or butene to dichlorbutene as described in Patent No. 2,948,760. Referring to Figure 1 a stream comprising mainly monochlorbutenes and dichlorbutenes together with minor amounts of dichlorbutanes, 1-chlorbutadiene and high boiling products, which is the reaction product obtained by the chlorination of butene and butadiene after removal of lower boiling compounds, such as hydrogen chloride and unreacted butane, butene and butadiene, is fed to a distillation column 1, in which a monochlorbutenes fraction is separated overhead, while crude dichlorbutenes and high boilers are removed from the foot. The monochlorbutenes are passed to a pyrolysis reactor 2 and the pyrolysis product after cooling is passed to a further distillation column 3 from the head of which butadiene and hydrogen chloride are removed. From the foot of column 3 unchanged monochlorbutenes and high boiling products are removed and passed to a further distillation column 4, in which the monochlorbutenes are removed overhead and recycled to the pyrolysis reactor and the high boiling compounds are removed from the foot.

Figure 2:
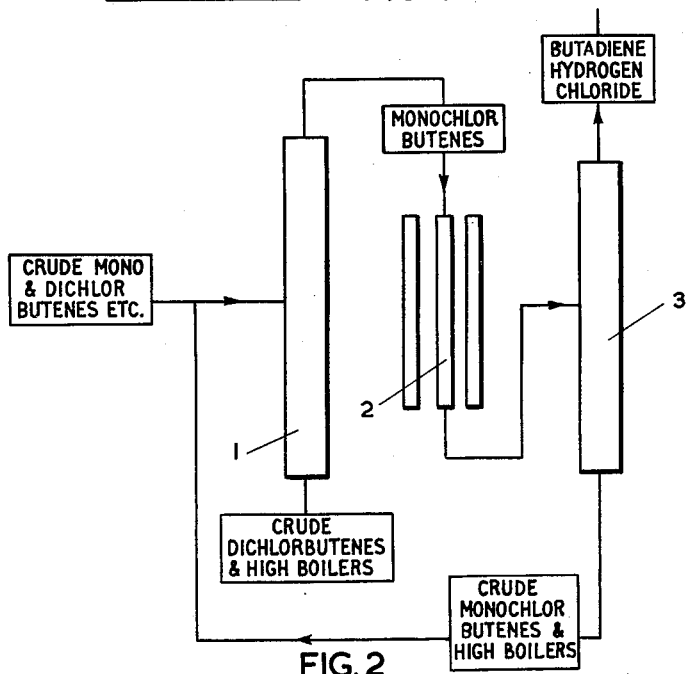

Alternatively, as shown in Figure 2 the product from the foot of column 3 containing high boilers is passed back to join the feed into column 1 and the separation of the high boiling compounds is effected at that stage by removing the high boilers with dichlorbutenes at the foot of column 1.

Figure 3:
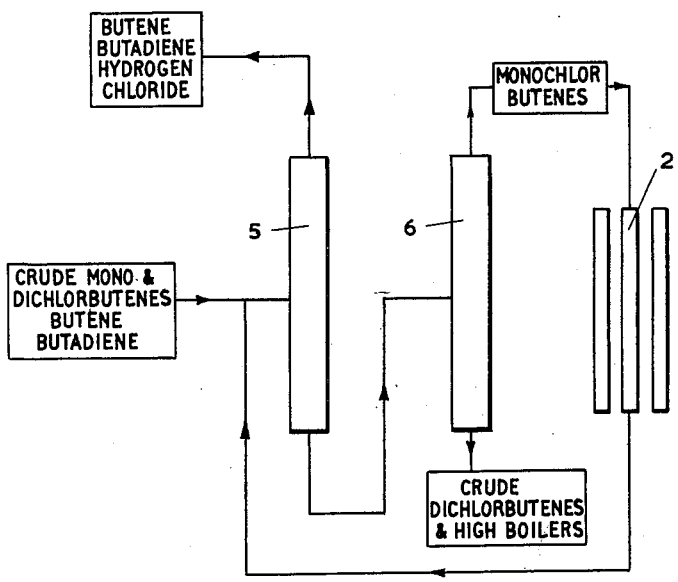

In the embodiment shown in Figure 3 the whole product of the pyrolysis reactor 2 is introduced into the still 5 together with the chlorination reaction product, the latter preferably having first been treated for the removal of hydrogen chloride. The feed to still 5 therefore contains butadiene, hydrogen chloride, monochlorbutenes and higher boiling compounds from the pyrolysis reaction, and unreacted butene and butadiene, monochlorbutene and dichlorbutenes from the chlorination reaction. In still 5 an overhead fraction is separated containing the hydrogen chloride and the $C_4$ hydrocarbons which is recycled to the chlorination reaction, the crude mono- and di-chlorbutenes are withdrawn from the base of still 5, and passed to still 6. In still 6 the monochlorbutenes free from higher boiling compounds are separated overhead and passed into the pyrolysis reactor 2, while crude dichlorbutenes and high boilers are withdrawn from the base.

The process of the present invention is further illustrated with reference to the following example.

*Example*

A process was carried out as illustrated in Figure 2. The starting material was a crude product obtained by the chlorination of a mixture of butene-2 and butadiene, from which low boiling compounds such as hydrogen chloride and unreacted butene and butadiene had been removed by distillation, and consisted of monochlorbutenes (25.6% by weight), dichlorbutanes (7.2%), dichlorbutenes (47.9%), 1-chlorbutadiene (3.3%) and higher boiling compounds (16.0%). This starting material, together with the base product from column 3, was fed to the distillation column 1 which was operated at a head temperature of 60–70° C. and a base temperature of 145–150° C. In this column monochlorbutenes were removed as the overhead fraction and crude dichlorbutenes were removed as base product. The monochlorbutenes were fed to the pyrolysis reactor 2 consisting of a metal tube heated to an outside wall temperature of 560° to 580° C. The conversion of monochlorbutenes in the pyrolysis reactor was 60%. The pyrolysis reactor products were fed into the distillation column 3, operated at a head temperature of 60–70° C. and a base temperature of about 140° C., from the head of which butadiene and hydrogen chloride were removed, and from the foot of which a stream consisting of monochlorbutenes (61.9%), dichlorbutanes (3.2%), dichlorbutenes (1.2%), 1-chlorbutadiene (21.4%) and higher boiling compounds (12.3%) were returned to column 1 in which the high boiling products were separated from the monochlorbutenes. The back pressure across the pyrolysis reactor rose from 0.2 inch of mercury at the start to only 2.3 inches of mercury after 131 hours running indicating a very minor amount of carbon deposition.

By way of comparison with this example a second process was carried out on the same apparatus using the same starting material. The pyrolysis product was treated for the separation of hydrogen chloride and butadiene, and the unchanged monochlorbutenes and any high boiling products of pyrolysis were mixed with fresh monochlorbutene feed and fed back directly to the pyrolysis. Back pressure across the reactor rose from 0.3 inch of mercury at the start to more than 4 inches of mercury after 19 hours. When the run was terminated inspection of the tube showed that a restriction was caused by a deposit of carbon.

We claim:

1. A process which comprises the steps of pyrolysing a starting material selected from the group consisting of monochlorbutenes and dichlorbutanes to produce butadiene, hydrogen chloride, higher boiling compounds and unpyrolysed starting material, removing butadiene and hydrogen chloride, separating by fractional distillation the unreacted starting material from the higher boiling compounds, and recycling the unreacted starting material to the pyrolysis step.

2. The process as claimed in claim 1, in which the product of the pyrolysis step after cooling is fractionally distilled to separate butadiene and hydrogen chloride as an overhead fraction before separating the unreacted starting material from the higher boiling compounds.

3. The process as claimed in claim 1 in which the whole pyrolysis product is distilled to separate hydrogen chloride, butadiene and monochlorbutenes as a combined overhead fraction leaving the higher boiling compounds as residue.

4. In the process for the production of dichlorbutenes by chlorinating a mixture of butene and butadiene-1,3 in the vapour phase at an elevated temperature to produce a chlorination reaction product containing monochlorbutenes and dichlorbutenes, pyrolysing the monochlorbutenes to produce a pyrolysis product containing butadiene, hydrogen chloride, higher boiling compounds and unreacted monochlorbutenes, introducing the butadiene to the chlorination stage and recovering dichlorbutenes from the chlorination reaction product, the steps of fractionally distilling the pyrolysis product together with the chlorination reaction product to separate butadiene in a first overhead fraction for introduction to the chlorination stage and monochlorbutenes free from higher boiling compounds as a second overhead fraction for introduction to the pyrolysis stage.

5. In the process for the production of dichlorbutenes by chlorinating a mixture of butene and butadiene-1,3 in the vapour phase at an elevated temperature to produce a chlorination reaction product containing monochlorbutenes and dichlorbutenes, pyrolysing the monochlorbutenes to produce a pyrolysis product containing butadiene, hydrogen chloride, higher boiling compounds and unreacted monochlorbutenes, introducing the butadiene to the chlorination stage and recovering dichlorbutenes from the chlorination reaction product, the steps of separating butadiene from the pyrolysis product in an overhead fraction for introduction to the chlorination stage, and fractionally distilling the remainder of the pyrolysis product together with the chlorination reaction product to separate monochlorbutenes free from higher boiling compounds as an overhead fraction for introduction to the pyrolysis stage.

References Cited in the file of this patent

UNITED STATES PATENTS

| | | |
|---|---|---|
| 2,343,107 | Cass et al. | Feb. 29, 1944 |
| 2,369,117 | Carter | Feb. 13, 1945 |
| 2,379,708 | Hearne | July 3, 1945 |

UNITED STATES PATENT OFFICE
CERTIFICATION OF CORRECTION

Patent No. 2,979,542                                  April 11, 1961

Frederick James Bellringer et al.

It is hereby certified that error appears in the above numbered patent requiring correction and that the said Letters Patent should read as corrected below.

Column 2, line 22, after "the", first occurrence, insert -- distillation may be carried out in a separate column; in --.

Signed and sealed this 15th day of August 1961.

(SEAL)
Attest:

ERNEST W. SWIDER
Attesting Officer

DAVID L. LADD
Commissioner of Patents